US009359492B2

(12) United States Patent
Goda et al.

(10) Patent No.: US 9,359,492 B2
(45) Date of Patent: Jun. 7, 2016

(54) LONG-FIBER-REINFORCED RESIN COMPOSITION AND MOLDED ARTICLE THEREOF

(75) Inventors: Hirofumi Goda, Sodegaura (JP); Toru Iwashita, Sodegaura (JP)

(73) Assignee: PRIME POLYMER CO., LTD., Tokyo (JP)

(*) Notice: Subject to any disclaimer, the term of this patent is extended or adjusted under 35 U.S.C. 154(b) by 0 days.

(21) Appl. No.: 12/922,348

(22) PCT Filed: Mar. 19, 2009

(86) PCT No.: PCT/JP2009/055388
§ 371 (c)(1),
(2), (4) Date: Sep. 13, 2010

(87) PCT Pub. No.: WO2009/116608
PCT Pub. Date: Sep. 24, 2009

(65) Prior Publication Data
US 2011/0040022 A1 Feb. 17, 2011

(30) Foreign Application Priority Data
Mar. 21, 2008 (JP) .................................. 2008-074405

(51) Int. Cl.
C08K 3/40 (2006.01)
C08L 33/00 (2006.01)
C08L 23/02 (2006.01)
C08L 23/10 (2006.01)
C08L 23/12 (2006.01)
C08K 7/14 (2006.01)
C08L 51/00 (2006.01)

(52) U.S. Cl.
CPC .................. *C08L 23/02* (2013.01); *C08L 23/10* (2013.01); *C08L 23/12* (2013.01); *C08K 7/14* (2013.01); *C08L 51/003* (2013.01); *C08L 2205/02* (2013.01); *C08L 2205/16* (2013.01)
USPC ........................................ 524/494; 524/522

(58) Field of Classification Search
CPC ......... C08L 23/02; C08L 23/10; C08L 23/12; C08L 51/003; C08L 2205/16; C08L 2205/02; C08L 2666/02; C08L 2666/06; C08L 2666/24; C08L 2205/025; C08L 2203/12; C08L 51/00; C08K 5/14; C08K 7/14; C08K 5/3435; C08K 5/3492; C08K 5/1345
USPC ................................................. 524/522, 494
See application file for complete search history.

(56) References Cited

U.S. PATENT DOCUMENTS 5,194,184 A 3/1993 Takeyama et al.
6,586,517 B2 * 7/2003 Saito et al. ..................... 524/494
6,649,685 B2 11/2003 Saito et al.
2011/0178229 A1 * 7/2011 Goda et al. .................... 524/562
2012/0065306 A1 * 3/2012 Goda ............................. 524/101

FOREIGN PATENT DOCUMENTS

| CN | 1906245 A | 1/2007 | |
|---|---|---|---|
| EP | 0 663 418 A1 | 7/1995 | |
| EP | 1 364 760 A1 | 11/2003 | |
| JP | 2001192468 A * | 7/2001 | |
| JP | 2001329178 A * | 11/2001 | |
| JP | 2004-300293 | 10/2004 | |
| JP | 2004300293 A * | 10/2004 | |
| JP | 2005220173 A * | 8/2005 | C08L 23/00 |
| JP | 2006-193735 | 7/2006 | |
| JP | 2006193735 A * | 7/2006 | |
| WO | WO 01/72511 A1 | 10/2001 | |
| WO | WO 2005/075554 A1 | 8/2005 | |
| WO | WO 2005075554 A1 * | 8/2005 | |
| WO | WO 2007/050393 A2 | 5/2007 | |

OTHER PUBLICATIONS

JP 2001-192468 A (2001), machine translation, JPO Advanced Industrial Property Network (AIPN).*
JP 2001-329178 A (2001), machine translation, JPO Advanced Industrial Property Network (AIPN).*
JP 2004-300293 A (2004), machine translation, JPO Advanced Industrial Property Network (AIPN).*
JP 2005-220173 A (2005), machine translation, JPO Advanced Industrial Property Network (AIPN).*
International Search Report issued May 19, 2009, in PCT/JP2009/055388.
International Preliminary Report on Patentability and Written Opinion issued Nov. 11, 2010, in PCT/JP2009/055388.
Office Action issued on Dec. 6, 2012 in the corresponding Chinese Patent Application No. 200980109941.6.
Notice of Opposition issued in European Application No. 09722098.2, issued Feb. 21, 2014.
Opposition filed against European Patent No. 2 256 150, issued Feb. 14, 2014 in the corresponding U.S. Appl. No. 12/922,348).

(Continued)

*Primary Examiner* — Susannah Chung
*Assistant Examiner* — Josephine Chang
(74) *Attorney, Agent, or Firm* — Oblon, McClelland, Maier & Neustadt, L.L.P.

(57) ABSTRACT

A long-fiber-reinforced resin composition including (A) a long-fiber-reinforced thermoplastic resin pellet including a thermoplastic resin, a modified polyolefin-based resin modified with an unsaturated carboxylic acid or its derivative and reinforcing fiber and satisfying (A-1) the melt index of the thermoplastic resin is 100-250 g/10 min, (A-2) the relaxation time λ of the thermoplastic resin is 0.1 (sec) or less, (A-3) the content of the reinforcing fiber is 40-70 wt %, and (A-4) the content of the modified polyolefin-based resin is 1-5 wt %; and (B) a polyolefin-based resin satisfying (B-1) the melt index of the polyolefin-based resin is 20-70 g/10 min, and (B-2) the relaxation time λ of the polyolefin-based resin is 0.23 (sec) or less; wherein the content of reinforcing fiber contained in (A) is 20-60 wt % relative to the total amount of the fiber-reinforced resin composition.

15 Claims, 1 Drawing Sheet

(56) References Cited

OTHER PUBLICATIONS

K. Senthil Kumar et al., "Mechanical Properties of Injection Molded Long Fiber Polypropylene Composites, Part 1: Tensil and Flexural Properties", Polymer Composites—2007, pp. 259-266.

Opposition in European Patent No. 2 256 150, Application No. 09 722 098.2, issued Dec. 23, 2015.

A.P. Gupta, et al., "Studies on the Effect of Coupling Agent on Glass Fiber Filled Polypropylene", Polymer-Plastics Technology and Engineering, 42:2, 297-309, DOI: 10.1081/PPT-120017935, 2003.

Opponent's Submission in European Patent No. 2 256 150, Application No. 09 722 098.2, dated Feb. 8, 2016.

Decision revoking the European Patent (Art. 101(2) and 101(3)(b) EPC), issued in corresponding EP 2 256 150 (Application No. 09 722 098.2), with the minutes, date Mar. 8, 2016.

\* cited by examiner

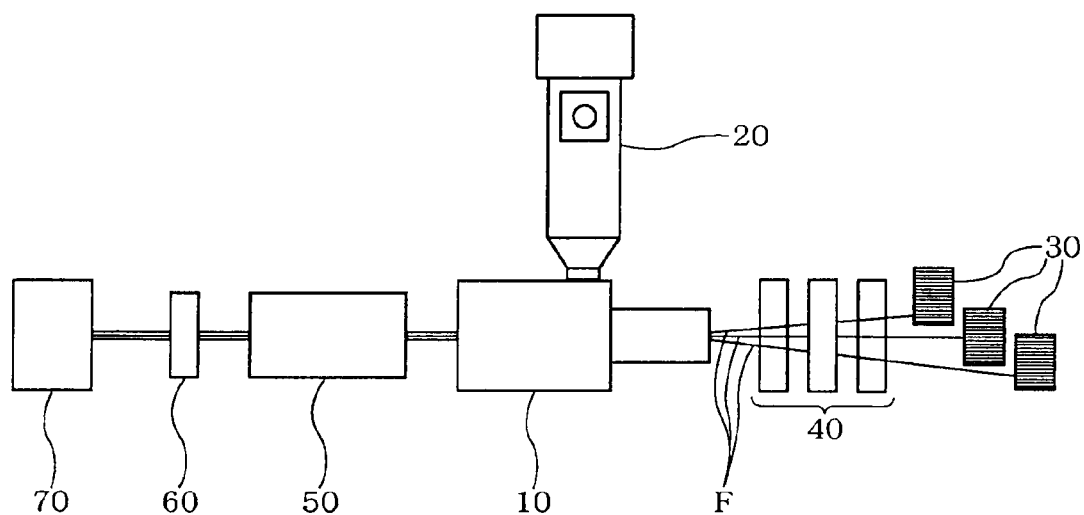

LONG-FIBER-REINFORCED RESIN COMPOSITION AND MOLDED ARTICLE THEREOF

TECHNICAL FIELD

The invention relates to a long-fiber-reinforced resin composition and a molded article thereof.

BACKGROUND ART

A molded article formed of a long-fiber-reinforced resin composition is widely used as a module component of an automobile which requires a high strength. However, due to insufficient dispersion of reinforcing fibers contained in this long-fiber-reinforced resin composition, the reinforcing fibers may appear in the form of a mass at the surface of a module component. Therefore, module components composed of a long-fiber-reinforced resin composition are required to be used as a component of a part which does not need an excellent external appearance or are required to be used after coating the surface thereof.

In order to solve the above-mentioned problems, a fiber-reinforced resin composition capable of improving the appearance of a molded article obtained therefrom is reported (Patent Document 1 and Patent Document 2).

However, a molded article obtained from the above-mentioned fiber-reinforced resin composition does not have an appearance as excellent as one required as an automobile module component, for example. Under such circumstances, a further improvement in appearance of a molded article has been required.

Patent Document 1: JP-A-2004-300293
Patent Document 2: JP-A-2006-193735

An object of the invention is to provide a long-fiber-reinforced resin composition which exhibits improved opening properties of reinforcing fibers at the time of molding and is capable of forming a molded article having an excellent appearance.

DISCLOSURE OF THE INVENTION

As a result of intensive studies, the inventors have found that, by using a resin with a short relaxation time in both a long-fiber-reinforced thermoplastic resin pellet and a resin for dilution, a mass of fibers can be prevented from appearing at the surface of a molded article when a composition formed of the pellet and the resin for dilution is used. The invention has been made based on such a finding.

According to the invention, the following long-fiber-reinforced resin composition or the like are provided.

1. A long-fiber-reinforced resin composition comprising the following component (A) and the component (B),
   the content of the component (A) being 50 to 90 wt % and the content of the component (B) being 10 to 50 wt %; and
   the content of reinforcing fiber contained in the component (A) being 20 to 60 wt % relative to the total amount of the fiber-reinforced resin composition:
   [Component (A)]
   a long-fiber-reinforced thermoplastic resin pellet comprising a thermoplastic resin, a modified polyolefin-based resin modified with an unsaturated carboxylic acid or its derivative and reinforcing fiber and satisfying the following (A-1) to (A-4):
   (A-1): the melt index of the thermoplastic resin (resin temperature: 230° C., load: 21.18N) is 100 to 250 g/10 min;
   (A-2): the relaxation time λ of the thermoplastic resin at an angular frequency ω=1 (rad/sec) calculated from the storage modulus G' and the loss modulus G" measured by means of a cone-and-plate rheometer is 0.1 (sec) or less;
   (A-3) the content of the reinforcing fiber is 40 to 70 wt %; and
   (A-4) the content of the modified polyolefin-based resin is 1 to 5 wt %;
   [Component (B)]
   a polyolefin-based resin satisfying the following (B-1) and (B-2):
   (B-1) the melt index of the polyolefin-based resin (resin temperature: 230° C., load: 21.18N) is 20 to 70 g/10 min; and
   (B-2) the relaxation time λ of the polyolefin-based resin at an angular frequency ω=1 (rad/sec) calculated from the storage modulus G' and the loss modulus G" measured by means of a cone-and-plate rheometer is 0.23 (sec) or less.

2. The long-fiber-reinforced resin composition according to 1, wherein the long-fiber-reinforced thermoplastic resin pellet further satisfies the following (A-5):
   (A-5): the pellet length of the long-fiber-reinforced thermoplastic resin pellet is 4 mm to 8 mm.

3. The long-fiber-reinforced resin composition according to 1 or 2, wherein the reinforcing fiber is glass fiber and the thermoplastic resin is a polyolefin-based resin.

4. A molded article formed from the long-fiber-reinforced resin composition according to any one of 1 to 3.

The invention can provide a long-fiber-reinforced resin composition containing reinforcing fibers which exhibits good opening properties at the time of molding and is capable of forming a molded article with an excellent appearance.

BRIEF DESCRIPTION OF THE DRAWINGS

FIG. 1 is a diagrammatical view showing a pellet production apparatus.

BEST MODE FOR CARRYING OUT THE INVENTION

The long-fiber-reinforced resin composition of the invention comprises a long-fiber-reinforced thermoplastic resin pellet (component (A)) which comprises a thermoplastic resin, a modified polyolefin-based resin which has been modified with an unsaturated carboxylic acid or its derivative (hereinafter often simply referred to as a modified polyolefin-based resin) and reinforcing fibers.

The long-fiber-reinforced thermoplastic resin pellet as the component (A) satisfies the following (A-1) to (A-4).
(A-1) the melt index of the thermoplastic resin (resin temperature: 230° C., load: 21.18N) is 100 to 250 g/10 minutes;
(A-2) the relaxation time λ of the thermoplastic resin at an angular frequency ω=1 (rad/sec) calculated from the storage modulus G' and the loss modulus G" measured by means of a cone-and-plate rheometer is 0.1 (sec) or less;
(A-3) the content of the reinforcing fiber is 40 to 70 wt %; and
(A-4) the content of the modified polyolefin-based resin is 1 to 5 wt %.

There are no particular restrictions on the thermoplastic resin contained in the long-fiber-reinforced thermoplastic resin pellet (component (A)) as long as it satisfies the above-mentioned (A-1) and (A-2). For example, a polyolefin-based resin, a polystyrene-based resin, a polycarbonate-based resin or the like can be used, for example. More specific examples of the polyolefin-based resin, a polyethylene-based resin such as an ethylene homopolymer, a polypropylene-based resin such as a propylene homopolymer, an ethylene-propylene copolymer-based resin such as an ethylene-propylene block copolymer or the like can be given. As the polystyrene-based resin, atactic polystyrene, syndiotactic polystyrene or the like can be mentioned.

The above-mentioned thermoplastic resin may be used alone or in combination of two or more.

The melt index of the thermoplastic resin (resin temperature: 230° C., load: 21.18N) is 100 to 250 g/10 min, and preferably 100 to 150 g/10 min. If the melt index of the thermoplastic resin is less than 100 g/10 minutes, the reinforcing fibers may not be opened easily at the time of molding. On the other hand, if the melt index of the thermoplastic resin exceeds 250 g/10 min, the strength of the long-fiber-reinforced thermoplastic resin pellet may be lowered.

In order to control the melt index of the thermoplastic resin in the above-mentioned range, in the production of the thermoplastic resin, the molecular weight thereof is adjusted, for example, by controlling the hydrogen concentration at the time of polymerization, the thermoplastic resin is decomposed with a peroxide, or a resin having a different melt index is blended or kneaded, for example.

As the method for producing a thermoplastic resin, a known production method such as the method for producing a polypropylene resin composition as disclosed in JP-A-H11-071431, JP-A-2002-234976 or JP-A-2002-249624 can be used.

The thermoplastic resin has a relaxation time $\lambda=G'\div(G''\times\omega)$, that is, $G'\div G''$, at an angular frequency $\omega=1$ (rad/sec) calculated from the storage modulus $G'$ and the loss modulus $G''$ measured by means of a cone-and-plate rheometer of 0.1 (sec) or less. (relaxation time $\lambda \leq 0.1$ (sec)). If the relaxation time $\lambda$ exceeds 0.1 (sec), the appearance of the resulting molded article may be deteriorated.

The relaxation time $\lambda$ is normally 0.01 to 0.1 (sec), preferably 0.02 to 0.05 (sec).

The relaxation time $\lambda$ will be explained hereinbelow.

If an external force is applied to a material system which is in an equilibrium state and if this external force is removed after the material system reaches a new equilibrium or stationary state, the system returns to the original equilibrium state due to an internal motion of the system. This phenomenon is referred to as a relaxing phenomenon. The specific time constant which serves as a guide for determining the time needed in relaxing is referred to as the relaxation time. In the case of molding a polymer, the molten polymer is fluidized. At this time, the molecular chain is extended in the direction of fluidization and aligned (this referred to as the "oriented"). However, when the fluidization is complete and the cooling starts, no stress is exerted on molecules, and each molecular chain starts to move to orient to an arbitral direction (this referred to as the "relaxing of the molecular chain").

This relaxation time $\lambda$ can be expressed by $\lambda=G'/\omega\ G''=G'/G''$ with an angular frequency $\omega=10°=1$ (rad/sec).

Here, $G'$ is a storage modulus and shows elastic properties of a thermoplastic resin, and $G''$ is a loss modulus and shows viscous properties of a thermoplastic resin. As is apparent from this equation, a larger (longer) relaxation time $\lambda$ means a larger $G'$, which means the amount of components showing elastic properties is increased in the thermoplastic resin. On the other hand, a smaller (shorter) relaxation time $\lambda$ means a larger $G''$, which means the amount of components showing viscous properties is increased in the thermoplastic resin. That is, the resin has a small molecular weight and has a narrow molecular weight distribution.

The following methods can be used for controlling the relaxation time $\lambda$.

(1) The resin is decomposed with a peroxide or the like to allow the molecular weight distribution to vary (in particular, by conducting decomposition, at a high magnification, of resins with a high molecular weight, a resin with a small $\lambda$ value can be obtained easily).

(2) A plurality of resins differing in molecular weight distribution are mixed (it is effective to form resins with narrow molecular weight distributions by using a highly-active catalyst, using a large amount of a peroxide to increase the decomposition ratio, or the like, and combine the resins thus formed).

(3) Each of polymerization conditions of a multi-stage polymerization is adjusted (however, this method may be disadvantageous in respect of cost for implementation on the industrial scale).

(4) Selection of a polymerization catalyst.

The modified polyolefin-based resin contained in the long-fiber-reinforced thermoplastic resin pellet (component (A)) which has been modified by an unsaturated carboxylic acid or its derivative is a resin having a functional group such as a carboxyl group and a carboxylic anhydride group in a polyolefin-based resin. Examples of the polyolefin-based resin to be modified include the above-mentioned polyethylene-based resin and the polypropylene-based resin.

When the polypropylene-based resin or its mixture is used as the thermoplastic resin contained in the long-fiber-reinforced thermoplastic resin pellet, it is preferable to use a modified polypropylene-based resin as the modified polyolefin-based resin.

Examples of the modified polypropylene-based resin include modified propylene homopolymers, modified propylene-α-olefin random copolymers and modified propylene-α-olefin block copolymers.

As the method for modifying a polyolefin-based resin, graft modification or copolymerization can be used. As the unsaturated carboxylic acid used for modifying, acrylic acid, methacrylic acid, maleic acid, nadic acid, fumaric acid, itaconic acid, crotonic acid, citraconic acid, sorbic acid, mesaconic acid, angelic acid, phthalic acid or the like can be given. As the derivative thereof, acid anhydrides, esters, amides, imides, metal salts or the like can be given. For example, maleic anhydride, itaconic anhydride, citraconic anhydride, nadic anhydride, phthalic anhydride, methyl acrylate, methyl methacrylate, ethyl acrylate, butyl acrylate, monoethyl maleate, acrylamide, maleic monoamide, maleimide, N-butyl maleimide, sodium acrylate and sodium methacrylate or the like can be given, for example. Of these, unsaturated dicarboxylic acids and derivative thereof are preferable, with maleic anhydride or phthalic anhydride being particularly preferable.

The added amount of carboxylic acid in the modified polyolefin-based resin is preferably 0.1 to 14 wt %, more preferably 0.8 to 8 wt %. The acid added amount is obtained by measuring an IR spectrum of a resin, and determining a peak area value in 1670 $cm^{-1}$ to 1810 $cm^{-1}$.

The modification of the polyolefin-based resin may be conducted prior to the production of the long-fiber-reinforced thermoplastic resin pellet, or may be conducted during the melt kneading process in the production of the pellet.

In the case where the modification of the polyolefin-based resin is conducted prior to the production of the pellet, when the long-fiber-reinforced thermoplastic resin pellet is prepared, an adequate amount of the acid-modified polyolefin-based resin is added to the thermoplastic resin.

When the modification is conducted during the melt kneading process, by kneading a polyolefin-based resin and an unsaturated carboxylic acid or its derivative in an extruder using an organic peroxide, the unsaturated carboxylic acid or its derivative is subjected to graft copolymerization for modification.

As the above-mentioned organic peroxide, benzoyl peroxide, lauroyl peroxide, azobisisobutyronitrile, dicumyl peroxide, t-butylhydroperoxide, α,α'-bis(t-butylperoxydiisopropyl)benzene, bis(t-butyldioxyisopropyl)benzene, 2,5-dimethyl-2,5-di(t-butylperoxy)hexane, 2,5-dimethyl-2,5-di(t-butylperoxy)hexine-3, di-t-butylperoxide, cumenhydroperoxide, or the like can be given, for example.

The content of the modified polyolefin-based resin is 1 to 5 wt %, preferably 1.5 to 3.5 wt %, relative to the total amount of the long-fiber-reinforced thermoplastic resin pellet (component (A)).

If the content of the modified polyolefin-based resin is less than 1 wt %, the interfacial adhesion between the fiber and the resin may be lowered, resulting in a lowering in strength. On the other hand, if the content of the modified polyolefin-based resin exceeds 5 wt %, the molecular weight of the entire resin pellet may be lowered, resulting in a lowering in strength.

The melt index of the modified polyolefin-based resin (resin temperature: 230° C., load: 21.18N) is normally 150 to 350 g/10 min.

Although there are no particular restrictions on the reinforcing fiber to be contained in the long-fiber-reinforced thermoplastic resin pellet (component (A)), organic fibers such as carbon and nylon and inorganic fibers such as basalt and glass fibers can be given, for example. Of these, glass fibers are preferable.

As the glass fibers, those obtained by subjecting glass such as E glass (Electrical glass), C glass (Chemical glass), A glass (Alkali glass), S glass (High strength glass) and alkali-resistant glass to melt spinning to form into filament-like fibers can be given.

As the raw material for the long glass fibers, continuous glass fiber bundles, which are commercially available as the glass roving, are used. The average fiber diameter thereof is normally 3 to 30 μm, the number of bundled filaments is 400 to 10,000, and the Tex yarn number is 300 to 20,000 g/km. The average fiber diameter is preferably 13 to 20 μm and the number of bundles is preferably 1,000 to 6,000. The average fiber diameter is further preferably 16 to 18 μm and the number of bundles is further preferably 3,000 to 5,000.

As disclosed in the JP-A-H06-114830, a plurality of fiber bundles may be further bundled.

The fiber length of the glass fiber in the pellet is normally 4 to 8 mm, preferably 5 to 7 mm. The fiber diameter is preferably 10 to 20 μm, more preferably 13 to 18 μm.

The content of the reinforcing fibers is 40 to 70 wt %, preferably 45 to 60 wt %, of the entire long-fiber-reinforced thermoplastic resin pellet (component (A)).

If the content of the reinforcing fibers is less than 40 wt %, the productivity may be lowered. On the other hand, if the content of the reinforcing fibers exceeds 70 wt %, the amount of the glass fiber may be increased, whereby the amount of glass fibers remained unopened may be increased.

The surface of the reinforcing fiber can be subjected to various surface treatments such as an electrolytic treatment and a surface treatment with a binder so as to allow it to have a functional group. For the surface treatment, it is preferable to use a binder. It is particularly preferable to use a binder containing a coupling agent. By using the reinforcing fiber which has been subjected to a surface treatment in this way, it has adhesion with a thermoplastic resin, whereby a molded article with excellent strength and appearance can be obtained.

As the binder, those containing a coupling agent as described in JP-A-2003-253563 can be given, for example.

The coupling agent can be suitably selected from a silane-based coupling agent such as aminosilane and epoxysilane and coupling agents which have conventionally been known as a titanium-based coupling agent.

As the binder, in addition to the binders containing a coupling agent, those containing a resin emulsion are preferable in order to facilitate the handling.

As the resin emulsion contained in the binder, a urethane-based emulsion, an olefin-based emulsion, an acryl-based emulsion, a nylon-based emulsion, a butadiene-based emulsion, an epoxy-based emulsion or the like can be used. Of these, it is preferable to use a urethane-based emulsion or an olefin-based emulsion. Here, as the urethane-based binder, normally, both a one-pack type binder such as an oil-modified type binder, a moisture-hardening type binder and a block type binder and a two-pack type binder such as a catalyst-hardening type binder and a polyol hardening type binder may be used as long as it contains a polyisocyanate obtained by a polyadditional reaction of a diisocyanate compound and polyvalent alcohol in an amount of 50 wt % or more. Representative examples of which include a Vondic series and a Hydran series (both are manufactured by Dainippon Ink & Chemicals, Inc.).

On the other hand, as the olefin-based binder, for example, an aqueous urethane, a modified polyolefin-based resin which has been modified by an unsaturated carboxylic acid or its derivative can be used.

The above-mentioned long-fiber-reinforced thermoplastic resin pellet (component (A)) composed of a thermoplastic resin, a modified polyolefin-based resin and reinforcing fibers can be produced by a known method such as drawing. After each part of the component is subjected to melt kneading separately, the parts may then be mixed (blended).

In the long-fiber-reinforced thermoplastic resin pellet, the aspect ratio of the fibers in the composition is increased to allow a composition with a high strength to be obtained easily. Therefore, more significant advantageous effects are attained.

The long-fiber-reinforced thermoplastic resin pellet is normally in the shape of a column.

The pellet length of the long-fiber-reinforced thermoplastic resin pellet is preferably 4 mm to 8 mm, more preferably 5 mm to 7 mm. If the pellet length of the long-fiber-reinforced thermoplastic resin pellet is less than 4 mm, effects of improving rigidity, heat resistance and impact strength may be low, and the molded article may suffer sufficient warp deformation. If the pellet length of the long-fiber-reinforced thermoplastic resin pellet exceeds 8 mm, molding may become difficult.

In the invention, in the long-fiber-reinforced thermoplastic resin pellet, it is preferred that the reinforcing fibers having almost the same length (4 mm to 8 mm) be arranged in parallel with each other.

The long-fiber-reinforced thermoplastic resin pellet can be obtained easily by introducing a reinforcing fiber roving composed of several thousands fibers into an impregnation dice, allowing the molten polyolefin-based resin to be impregnated uniformly between the filaments, and cutting it into a necessary length.

For example, while supplying from an extruder a molten resin to an impregnation dice provided at the tip of an extruder, a continuous glass fiber bundle is passed through the dice so as to allow this glass fiber bundle to be impregnated with a molten resin. Thereafter, the glass fiber bundle is drawn through a nozzle, and then pelletized into a necessary length.

Also, a method can be taken in which a polyolefin-based resin, unsaturated carboxylic acid or its anhydride, organic peroxides or the like are dry blended, and the resulting blend is put into a hopper of an extruder, whereby supply is conducted simultaneously with modification.

There are no particular restrictions on the method for impregnation, and any of the following methods is usable. A method in which a roving is passed through a fluidized bed of resin particles, and then heated to a temperature higher than the melting point of a resin (JP-A-S46-4545); a method in which a roving of reinforcing fibers is impregnated with a molten thermoplastic resin by means of a cross head die (JP-A-S62-60625, JP-A-S63-132036, JP-A-S63-264326, JP-A-H01-208118); a method in which after resin fibers and a roving of reinforcing fibers are mixed, and the mixture is then heated to a temperature higher than the melting point of the resin, whereby the roving is impregnated with the resin (JP-A-S61-118235); a method in which a plurality of rods are arranged within a die, and the roving is wound around the rods in a zigzag manner to allow the fiber to open, thereby to cause the roving to be impregnated with the molten resin (JP-A-H10-264152); and a method in which a roving is allowed to pass between a pair of pins for fiber opening while avoiding contact with the pin (WO97/19805).

Further, during the process of melting the resin, an extruder having two or more feed parts may be used, and a resin and a decomposing agent for the resin (in the case of a polypropylene resin, an organic peroxide is preferable) may be introduced from a top feed and another resin may be introduced from a side feed.

Further, two or more extruders (extruding parts) may be used, and a resin and a decomposing agent for the resin (in the case of a polypropylene resin, an organic peroxide is preferable) may be introduced to one or more extruders.

Further, a resin, an unsaturated carboxylic acid and its derivative and a decomposing agent (in the case of a polypropylene resin, an organic peroxide is preferable) may be introduced into at least one part of an extruder.

The long-fiber-reinforced resin composition of the invention contains a polyolefin-based resin (component (B)) satisfying the following (B-1) and (B-2).
(B-1) The melt index of a polyolefin-based resin (resin temperature: 230° C., load: 21.18N) is 20 to 70 g/10 min.
(B-2) The relaxation time λ of the polyolefin-based resin at an angular frequency ω=1 (rad/sec) calculated from the storage modulus G' and the loss modulus G" measured by means of a cone-and-plate rheometer is 0.23 (sec) or less.

Although there are no particular restrictions on the polyolefin-based resin as the component (B) as long as it satisfies the above-mentioned (B-1) and (B-2), polyethylene-based resins (for example, low-density polyethylene (LDPE), an ethylene-α-olefin copolymer), polypropylene-based resins or the like can be used. Polypropylene-based resins are preferable.

Propylene-based resins include a propylene homopolymer, a propylene-α-olefin random copolymer, a propylene-α-olefin block copolymer or the like.

The melt index of the polyolefin-based resin (resin temperature: 230° C., load: 21.18N) is 20 to 70 g/10 min, preferably 20 to 60 g/10 min. If the melt index of the polyolefin-based resin is less than 20 g/10 min, the fluidity of the resin composition may be lowered and mold transferability may be lowered. When the melt index of the polyolefin-based resin exceeds 70 g/10 min, the amount of unopened glass fibers may be increased.

As for the method for adjusting the melt index of the polyolefin-based resin in the above-mentioned range, the same methods as mentioned above referring to the component (A) can be used.

The polyolefin-based resin has a relaxation time $\lambda = G' \div (G'' \times \omega)$, that is, $G' \div G''$, at an angular frequency $\omega = 1$ (rad/sec) calculated from the storage modulus G' and the loss modulus G" measured by means of a cone-and-plate rheometer of 0.23 (sec) or less (relaxation time $\lambda \leq 0.23$ (sec)). If the relaxation time λ exceeds 0.23 (sec), the amount of unopened glass fibers may be increased, and molding of a large-sized article for automobiles, for example, may become difficult.

The relaxation time of the polyolefin-based resin is normally 0.01 to 0.23 (sec), preferably 0.05 to 0.2 (sec).

The definition and control method for the relaxation time λ are as explained above referring to the component (A).

The long-fiber-reinforced resin composition of the invention comprise the component (A) and the component (B) as mentioned above, and comprises the component (A) in an amount of 50 to 90 wt % and the component (B) in an amount of 10 to 50 wt %. As for the composition ratio of the component (A) to the component (B), it is preferred that the content of the component (A) be 50 to 80 wt % and the content of the component (B) be 20 to 50 wt %.

The content of the reinforcing fibers contained in the long-fiber-reinforced resin composition of the invention is 20 to 60 wt %, preferably 25 to 40 wt %, relative to the total amount of the long-fiber-reinforced resin composition.

If the content of the reinforcing fiber is less than 20 wt %, the strength of a resulting molded article may be insufficient. If the content of the reinforcing fibers exceeds 60 wt %, the appearance of a resulting molded article may be poor.

The long-fiber-reinforced-resin composition of the invention may essentially consist of the component (A) and the component (B) as mentioned above, or may consist only of the components (A) and (B). The "essentially consist of" means that the above-mentioned composition consists of the component (A) and the component (B), and may contain the following additives in addition to these components.

The composition of the invention may contain various additives according to application. For example, additives for modification such as dispersants, lubricants, plasticizers, fire retardants, antioxidants (phenol-based antioxidants, phosphor-based antioxidants, sulfur-based antioxidants), antistatic agents, light-stabilizers, UV absorbers, crystallization accelerators (nucleating agents), foaming agents, cross-linking agents and antimicrobial agents; colorants such as pigments and dyes; particulate fillers such as carbon black, titanium oxide, rouge, azo pigments, anthraquinone pigments, phthalocyanine, talk, calcium carbonate, mica and clay; short fiber fillers such as wollastonite; and whiskers such as potassium titanate can be added.

These additives may be contained in the pellet during the production of the pellet or may be added during the production of a molded article.

There are no particular restrictions on the method for producing the long-fiber-reinforced resin composition of the invention, and it may be produced by dry blending or melt kneading, for example. The production conditions are not particularly restricted, and can be appropriately adjusted according to the type or the like of the materials used.

If the component (A) and the component (B) are mixed by dry blending, in order to obtain effects of further improving rigidity, impact strength and durability, while keeping the fiber length in the composition, it is preferred that the resulting mixture after dry blending be directly supplied to a molding machine such as an injection molding machine without passing an extruder.

The long-fiber-reinforced resin composition of the invention can be molded into various molded articles.

As for the molding method, known molding methods such as injection molding, extrusion molding, blow molding, compression molding, injection compression molding, gas-assist injection molding and foam injection molding can be used without restrictions. In particular, injection molding, compression molding and injection compression molding are preferable.

A molded article obtained from the long-fiber-reinforced resin composition of the invention has an excellent appearance since reinforcing fibers are fully open. Further, since the length of the reinforcing fibers is kept long, the physical properties which are equivalent to or higher than those of the conventional products can be kept.

EXAMPLES

The invention will be described in more detail according to the examples, which should not be construed as limiting the scope of the invention.

Various parameters in tables were measured by the following methods.

[Melt Index (MI)]

The melt index was measured according to JIS K 7210-1999, at a resin temperature of 230° C. at a load of 21.18N.

[Storage Modulus (G'), Loss Modulus (G") and Relaxation Time (λ)]

The storage modulus (G'), the loss modulus (G") and the relaxation time λ were measured by the following conditions by means of a cone-and-plate rheometer.

Measurement apparatus: system-4 (product name) manufactured by Reometrics Co., Ltd.

Shape of the measurement part: Cone-and-plate type

Measurement conditions: 175° C., strain 30% (sinusoidal strain)

The storage modulus G' and the loss modulus G" were measured under the above-mentioned conditions, and the relaxation time λ at an angular frequency (of a sinusoidal strain applied to the disk) ω=1 (rad/sec) was obtained by calculating $\lambda(sec)=G'\div(G''\times\omega)=G'\div G''$.

The measurement by means of a cone-and-plate rheometer is explained in the "Journal of the Japan Society of Polymer Processing, 1 (4), 355 (1989)", "Experimental Polymers, Vol. 9, 'dynamic properties 1', published by Kyoritsu Shuppan, Co., Ltd. (1982)", JP-A-2003-226791 or the like.

Example 1

Using a pellet production apparatus shown in FIG. 1, long-fiber-reinforced thermoplastic resin pellets were produced.

In this FIGURE, 10 is a die, 20 is an extruder which supplies a thermoplastic molten resin to the die 10, 30 is a roll of fiber bundles F, 40 is a group of tension roll which gives a specific tension to the fiber bundles F to be drawn into the die 10, 50 is a cooling means for cooling the molten resin-impregnated fiber bundles which have been drawn from the die 10, 60 is a roll for withdrawing the fiber bundles, and 70 is a pelletizer which cuts the molten resin-impregnated fiber bundles which have been drawn to form long-fiber-reinforced thermoplastic resin pellets. In this apparatus, three independent fiber bundles F are simultaneously impregnated with the molten resin.

Specific production conditions are as follows:

Die: 50 mφ, installed at the tip of an extruder and 4 rods are arranged linearly in an impregnation part Fiber bundle: A glass roving obtained by bundling 4000 glass fibers with a fiber diameter of 16 μm of which the surface has been treated with aminosilane Preheating temperature: 200° C.

Thermoplastic resin and modified polyolefin-based resin: PP-A (propylene homopolymer) shown in Table 1 and PP-E (maleic anhydride-modified polypropylene, in which maleic anhydride is added in an amount of 2 wt %, H-1100P, manufactured by Prime Polymer Co., Ltd.) were blended such that the composition ratio shown in Table 2 was attained, followed by melting.

Melting temperature: 280° C.

Rod: Four rods with a diameter of 6 mm and a length of 3 mm

Inclination angle: 25° C.

The above-mentioned PP-A was a propylene homopolymer obtained by adding 0.1 wt % of bis(tert-butyldioxyisopropy)benzene (Perkadox 14, manufactured by Kayaku Akzo Co., Ltd.) as a peroxide to a propylene homopolymer (Y-6005GM, manufactured by Prime Polymer Co., Ltd.), followed by melt kneading.

Under the above-mentioned conditions, the fiber bundles were supplied to a die while the amount thereof was controlled by the tension roll groups, whereby the fiber bundles were impregnated with the resin. Thereafter, the fiber bundles were withdrawn from the die to cool, and cut by means of a pelletizer, whereby long-fiber-reinforced thermoplastic resin pellets with a pellet length of 6 mm were prepared.

The pellets thus obtained were blended with PP-F in an amount ratio shown in Table 2 such that the content of the glass fiber in the resulting composition became 40 wt %, whereby a long-fiber-reinforced resin composition was prepared.

PP-F is a propylene homopolymer obtained by mixing 30 parts by weight of Y-6005GM as a propylene homopolymer and 70 parts by weight of Y-900GV (manufactured by Prime Polymer Co., Ltd.) as a propylene homopolymer.

Then, the resulting composition was supplied to an injection molding machine (AZ7000, manufactured by Nissei Plastic Co., Ltd.) to produce 10 pieces of flat molded articles with a dimension of 200 mm×180 mm×3 mm.

In this injection molding machine, a film gate was used as a mold, and a full-flighted screw was used as a screw. Molding was conducted at a resin temperature of 250° C., a mold temperature of 45° C. and a filling speed of 20 mm/sec.

The number of fibers remained unopened in these molded articles was counted visually. Further, in order to standardize this number, the number of fibers remained unopened in the molded article (A) in Example 1 was taken as 100, and the ratio of the number of the fibers remained unopened in the molded article (B) in other examples and comparative examples was obtained as an index of unopened fibers. That is, the index of unopened fibers was expressed as follows: the index of unopened fibers=(the number of unopened fibers in B)÷(the number of unopened fibers in A)×100.

Examples 2 and 3 and Comparative Examples 1 to 6

The long-fiber-reinforced thermoplastic resin pellets, the compositions and the molded articles were prepared and evaluated in the same manner as in Example 1, except that the long-fiber-reinforced thermoplastic resin pellets and the compositions were prepared according to the composition ratios shown in Table 2 by using the thermoplastic resins, the modified polyolefin-based resins and the polyolefin-based resins shown in Table 1. The results are shown in Table 2.

TABLE 1

| | Grade* | Peroxide** [wt %] | MI [g/10 min] | λ [sec] |
|---|---|---|---|---|
| PP-A | Propylene homopolymer | Y-6005GM | 0.1 | 120 | 0.03 |
| PP-B | Propylene homopolymer | H50000: 50 parts by weight<br>J-3000GV: 50 parts by weight | 0 | 120 | 0.2 |
| PP-C | Propylene homopolymer | H50000: 60 parts by weight<br>J-3000GV: 40 parts by weight | 0 | 150 | 0.2 |
| PP-D | Propylene homopolymer | H50000: 70 parts by weight<br>J-3000GV: 30 parts by weight | 0 | 200 | 0.2 |
| PP-E | Maleic anhydride-modified polypropylene (added amount of maleic anhydride: 2 wt %) | H-1100P | 0 | 200 | — |
| PP-F | Propylene homopolymer | Y-6005GM: 30 parts by weight<br>Y-900GV·: 70 parts by weight | 0 | 20 | 0.2 |
| PP-G | Propylene homopolymer | Y-6005GM | 0 | 60 | 0.08 |
| PP-H | Propylene homopolymer | J-3000GV | 0 | 30 | 0.22 |
| PP-I | Propylene homopolymer | J139 | 0 | 60 | 0.2 |

*Each was manufactured by Prime Polymer Co., Ltd.
**Bis(tert-butyloxyisopropyl)benzene (Parkadox14, manufactured by Kayaku Akzo Corporation)

TABLE 2

| | | Example 1 | Example 2 | Example 3 | Com. Ex. 1 | Com. Ex. 2 | Com. Ex. 3 | Com. Ex. 4 | Com. Ex. 5 | Com. Ex. 6 |
|---|---|---|---|---|---|---|---|---|---|---|
| Component (A) | Thermoplastic resin | PP-A | PP-A | PP-A | PP-A | PP-B | PP-C | PP-D | PP-B | PP-B |
| | Modified polyolefin-based resin | PP-E | PP-E | PP-E | PP-E | PP-E | PP-E | PP-E | PP-E | PP-E |
| | Glass fiber | 16 μm | 16 μm | 16 μm | 16 μm | 16 μm | 16 μm | 16 μm | 16 μm | 16 μm |
| | Glass fiber content [wt %] | 50 | 50 | 50 | 50 | 50 | 50 | 50 | 50 | 50 |
| | Modified polyolefin content [wt %] | 2.5 | 2.5 | 2.5 | 2.5 | 2.5 | 2.5 | 2.5 | 2.5 | 2.5 |
| | Pellet length [mm] | 6 mm | 6 mm | 6 mm | 6 mm | 6 mm | 6 mm | 6 mm | 6 mm | 6 mm |
| Component (B) | Polyolefin-based resin | PP-F | PP-G | PP-H | PP-B | PP-F | PP-F | PP-F | PP-H | PP-I |
| Composition | Composition ratio (wt %) Component (A) | 80 | 80 | 80 | 80 | 80 | 80 | 80 | 80 | 80 |
| | Component (B) | 20 | 20 | 20 | 20 | 20 | 20 | 20 | 20 | 20 |
| | Glass fiber content [wt %] | 40 | 40 | 40 | 40 | 40 | 40 | 40 | 40 | 40 |
| Molded article | Index of unopened fibers | 100 | 125 | 223 | 1775 | 625 | 513 | 700 | 1013 | 1213 |

INDUSTRIAL APPLICABILITY

The molded article obtained by molding the long-fiber-reinforced resin composition of the invention can be suitably used in automobile parts (e.g. front end, fan shroud, cooling fan, engine undercover, engine cover, radiator box, side door, back door inner, back door outer, outer panel, fender, roof rail, door handle, luggage box, wheel cover, handle); parts for bicycles or motorcycles (e.g. luggage box, handle, and wheel); household appliances (e.g. parts for toilet seats with hot water spray for washing, bathroom supplies, bathtub components, chair legs, valves, and meter box); laundry components (washing tub, balance rings or the like), a fan for a wind power generator, power tools, handle of a lawn mower, hose joints, or the like.

The invention claimed is:

1. A long-fiber-reinforced resin composition comprising component (A) and component (B), wherein:
   a content of the component (A) is 50 to 90 wt %;
   a content of the component (B) is 10 to 50 wt %;
   a content of reinforcing fiber comprised in the component (A) is 20 to 60 wt % relative to a total amount of long-fiber-reinforced resin composition;
   component (A) is a long-fiber-reinforced thermoplastic resin pellet comprising a polypropylene-based resin as a thermoplastic resin, a modified resin comprising a polypropylene-based resin modified with maleic anhydride, and glass fiber as a reinforcing fiber, and satisfying (A-1) to (A-4):
   (A-1): a melt index of the thermoplastic resin at a resin temperature of 230° C. and a load of 21.18N, is 100 to 250 g/10 min;
   (A-2): a relaxation time λ of the thermoplastic resin at an angular frequency ω=1 (rad/sec) calculated from a storage modulus G' and a loss modulus G", measured with a cone-and-plate rheometer, is 0.02 to 0.05 (sec);
   (A-3) a content of the reinforcing fiber is 40 to 70 wt % of (A); and
   (A-4) a content of the modified resin is 1 to 2.5 wt % of (A); and component (B) is a resin comprising a polypropylene-based resin satisfying (B-1) and (B-2):
  (B-1) the component (B) has a melt index at a temperature of 230° C. and a load of 21.18N of 20 to 70 g/10 min; and
  (B-2) the component (B) has a relaxation time λ at an angular frequency ω=1 (rad/sec) calculated from a storage modulus G', and a loss modulus G", measured with a cone-and-plate rheometer of 0.23 (sec) or less.

2. The long-fiber-reinforced resin composition according to claim 1, wherein the long-fiber-reinforced thermoplastic resin pellet further satisfies (A-5):
  (A-5): a pellet length of the long-fiber-reinforced thermoplastic resin pellet is 4 mm to 8 mm.

3. A molded article formed from the long-fiber-reinforced resin composition according to claim 1.

4. A molded article formed from the long-fiber-reinforced resin composition according to claim 2.

5. The long-fiber-reinforced resin composition according to claim 1, wherein the reinforcing fiber has an average diameter of 3 to 30 μm.

6. The long-fiber-reinforced resin composition according to claim 1, wherein the reinforcing fiber has an average diameter of 13 to 20 μm.

7. The long-fiber-reinforced resin composition according to claim 1, wherein the reinforcing fiber has an average diameter of 16 to 18 μm.

8. The long-fiber-reinforced resin composition according to claim 1, wherein the glass fiber has a length of 4 to 8 mm.

9. The long-fiber-reinforced resin composition according to claim 1, wherein the glass fiber has a length of 5 to 7 mm.

10. The long-fiber-reinforced resin composition according to claim 1, wherein the modified resin is present in an amount of 1.5 to 2.5 wt% of (A).

11. The long-fiber-reinforced resin composition according to claim 1, wherein the content of the reinforcing fiber comprised in the component (A) is from 45 to 60 wt%.

12. The long-fiber-reinforced resin composition according to claim 1, wherein the component (B) has a melt index at a temperature of 230° C. and a load of 21.18N of 20 to 60 g/10 min.

13. The long-fiber-reinforced resin composition according to claim 1, wherein an amount of maleic anhydride in the modified resin is 0.1 to 14 wt%.

14. The long-fiber-reinforced resin composition according to claim 1, wherein an amount of maleic anhydride in the modified resin is 0.8 to 8 wt%.

15. The long-fiber-reinforced resin composition according to claim 1, wherein
  the thermoplastic resin in the component (A) is a polypropylene homopolymer,
  the modified resin in the component (A) comprises polypropylene modified with maleic anhydride, and
  the component (B) is a resin comprising a polypropylene homopolymer.

* * * * *